United States Patent
Tam et al.

(10) Patent No.: US 6,678,323 B2
(45) Date of Patent: Jan. 13, 2004

(54) BANDWIDTH REDUCTION FOR STEREOSCOPIC IMAGERY AND VIDEO SIGNALS

(75) Inventors: Wa James Tam, Orleans (CA); Lew Bohdan Stelmach, Nepean (CA)

(73) Assignee: Her Majesty the Queen in right of Canada, as represented by the Minister of Industry through Communications Research Centre, Ottawa (CA)

( * ) Notice: Subject to any disclaimer, the term of this patent is extended or adjusted under 35 U.S.C. 154(b) by 368 days.

(21) Appl. No.: 09/767,690

(22) Filed: Jan. 24, 2001

(65) Prior Publication Data

US 2002/0097319 A1 Jul. 25, 2002

(51) Int. Cl.$^7$ ................................................ H04N 7/12
(52) U.S. Cl. .............................. 375/240.03; 375/240.03
(58) Field of Search ........................ 375/240.03, 240.22; 282/239, 251; 348/705, 712, 713; H04N 7/12, 11/02, 11/04

(56) References Cited

U.S. PATENT DOCUMENTS

| | | | | |
|---|---|---|---|---|
| 5,453,787 A | * | 9/1995 | Hancock et al. | ........ 375/240.01 |
| 5,596,321 A | * | 1/1997 | Hekstra et al. | ................ 341/76 |
| 5,727,078 A | * | 3/1998 | Chupeau | ...................... 382/154 |
| 6,191,772 B1 | * | 2/2001 | Mical et al. | ................. 345/698 |
| 6,476,850 B1 | * | 11/2002 | Erbey | ........................... 348/51 |

OTHER PUBLICATIONS

Meegan et al., "Is monocular degradation visible in fused stereo images?", SPIE vol. 3639, pp. 12–17, Jan. 1999, San Jose California, USA.

Perkins, "Transactions Papers—Data Compression of Stereopairs", IEEE Transactions on Communications, vol. 40, No. 4, pp. 684–696, Apr. 1992.

Stelmach et al., "Perceptual Basis of Stereoscopic Video", SPIE vol. 3639, pp. 260–265, Jan. 1999, San Jose California, USA.

Stelmach et al., "Stereo Image Coding Based on Human Visual Characteristics: Mixed Resolution and Unequal Bit-Allocation", IWSNHC3DI'99, pp. 193–196, Sep. 15–17, 1999, Santorini, Greece.

Stelmach et al., "Stereo Image Coding: Effects of Stereo Mismatches on Image–Quality", International Workshop on HDTV '96, Oct. 8–9, 1996, Los Angeles California, USA.

Stelmach et al., "Stereo Image Quality: Effects of Spatio–Temporal Resolution", SPIE vol. 3639, pp. 4–11, Jan. 1999, San Jose California, USA.

Stelmach et al., "Stereoscopic image coding: Effect of disparate image–quality in left– and right–eye views", Signal Processing: Image Communication 14, pp. 111–117, 1998, Elsevier Science B.V.

(List continued on next page.)

*Primary Examiner*—Nhon Diep
(74) *Attorney, Agent, or Firm*—Freeman & Associates

(57) ABSTRACT

This invention relates to reducing bandwidth requirements for stereoscopic imagery and video signals. The invention comprises a method of producing two streams of images or signals for producing images, separately for the left eye and for the right eye. One image of each stereoscopic pair in the streams is of reduced quality relative to the other. On occurrence of a significant change in image content, or similar occurrence, the image quality of the two streams are switched or transposed, whereby the higher quality image is seen alternately by one eye and then the other. Intervals between switching are indeterminate, and such switching is continued for the duration of the streams of images or video signals.

20 Claims, 1 Drawing Sheet

OTHER PUBLICATIONS

Figure 1:
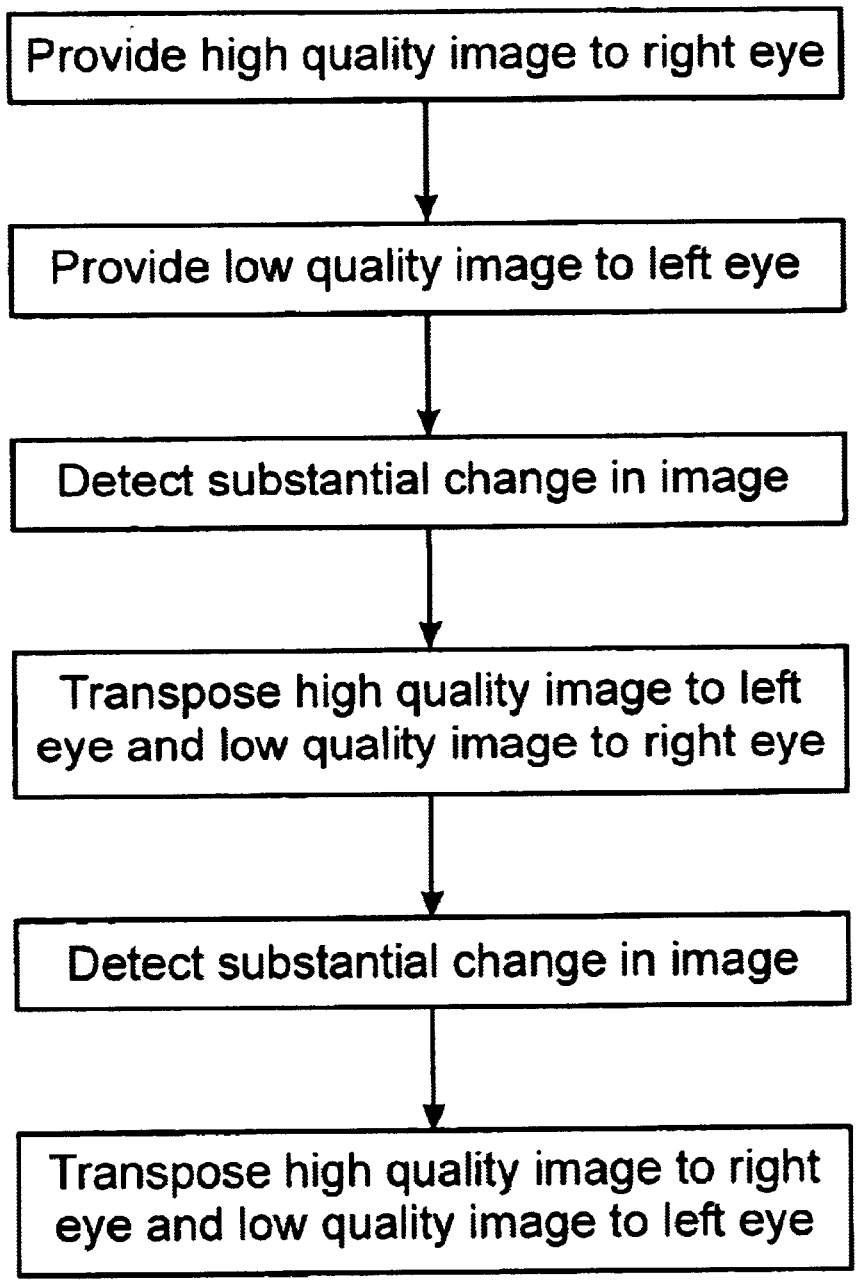

Stelmach et al., "Transactions Letters—Stereo Image Quality: Effects if Mixed Spatio–Temporal Resolution", IEEE Transactions on Circuits and Systems for Video Technology, vol. 10, No. 2, pp. 188–193, Mar. 2000.

Tam et al., "Bandwidth Reduction for Stereoscopic Video Signals", Stereoscopic Displays and Virtual Reality Systems VII, SPIE vol. 3957, pp. 33–40, Jan. 24–27, 2000, San Jose, California, USA.

Tam et al., "Perceived Image Quality of MPEG–2 Stereoscopic Sequences", Human Vision and Electronic Imaging II, SPIE vol. 3016, pp. 296–301, Feb. 10–13, 1997, San Jose, California USA.

Tam et al., "Psychovisual aspects of viewing stereoscopic video sequences", Stereoscopic Displays and Virtual Reality Systems V, SPIE vol. 3295, pp. 226–235, Jan. 26–29, 1998, San Jose, California, USA.

Tam et al., "Visual Masking at Video Scene Cuts", SPIE vol. 2411, pp. 111–119.

* cited by examiner

BANDWIDTH REDUCTION FOR STEREOSCOPIC IMAGERY AND VIDEO SIGNALS

BACKGROUND OF THE INVENTION

Stereoscopic image sequences are preferred over standard monoscopic image sequences because they provide an additional dimension that can significantly enhance a viewing experience. Not only is perceived depth enhanced, but so is perceived sharpness. However, the advantage of stereoscopic image sequences over monoscopic sequences is obtained with a cost in bandwidth and/or processing. Without extra compression, the bandwidth required to transmit stereoscopic sequences is twice that required for monoscopic sequences, because two streams of images or video signals must be transmitted, one for the left eye and one for the right eye, compared to the single stream required in monoscopic image sequences.

It has been proposed that asymmetrical coding can be used to reduce the required bandwidth for stereoscopic imagery and video signals. One such method has been proposed by M. G. Perkins, in "The Compression of Stereoscopics, *IEEE Transaction in Communications*, 40, pp. 644–692, 1992, and by T. Mitsuhashi, "Subjective image position in stereoscopic TV system—Consideration on comfortable stereoscopic images, *Human Vision, Visual Processing and Digital Display V.* 2179, pp. 259–266, 1994. Therein it is suggested that by providing a high quality picture to one eye and a reduced quality picture to the other eye, the fused-picture appreciated by the eyes would have a high quality, being dominated by the higher quality picture; this phenomenon has been reported before by visual scientists, e.g., B. Julesz, in Foundations of Cyclopean Perception, University of Chicago Press, p. 96, 1971. Thus, the viewer receives, or appears to receive, a high quality picture even though one eye is seeing a reduced quality picture. However, with the above systems, particularly with respect to the system of Perkins, bandwidth reduction is obtained by showing an image having lower quality consistently to one eye. Thus, although stereoscopic images can be of acceptable perceived quality with this method, it produces an imbalance of quality between the two eyes.

SUMMARY OF THE PRESENT INVENTION

As explained above, bandwidth reduction for stereoscopic video signals can be obtained by having one image of a stereoscopic pair of lower quality. Such reduction in image quality to one eye is compensated for by the image quality presented to the other eye, and the perceptually combined stereoscopic images can appear to have high quality. However, the purposeful introduction of an imbalance of quality between the eyes is not desirable for several reasons, including concerns for health, usage, and comfort. Specifically, effects of a sustained imbalance in the two eyes on children, whose visual system may still be developing, can be a safety and health concern, and its usage may give rise to potential liability for 3-D television broadcasters. An imbalance in the two eyes is also not good for people who have a strong dominance in one eye because the lower quality image may end up being presented consistently to the dominant eye, leading to perceived image quality that is worse than intended. Furthermore, this method may lead to visual fatigue especially with sustained viewing, because of a constant imbalance of image quality between the eyes.

The present invention overcomes the above disadvantages by balancing image quality between the two eyes over time. Broadly, the present invention comprises a step of interleaving high-quality images with reduced-quality images for each eye. This methodology spreads the reduced-quality images over the two eyes while maintaining benefits of perceived high image quality and savings in resources required for processing, storage, distribution, transmission, and display of stereoscopic images.

An important feature of the preferred embodiment of this invention is that the inter-leaving is controlled in such a way that reversals in image quality within a stream of images for one eye are yoked to the reversals in image quality in the stream to the other eye. Effectively, there is a cross-switch in image quality between the two streams so that high quality images are alternated between the left and right eyes; one eye always receives a high quality image. By switching, or reversing, the quality of the image between the two eyes, a more balanced effect on the eyes is obtained.

Another novel and key aspect of an embodiment of the invention is that the switching of image quality between the two streams of images occur at significant changes in image contents or features along the streams, so as to render the cross-switching unnoticeable by viewers. The switching need not occur at regular or identical periods; an important aspect of the switching in this embodiment is that it is activated only when a significant change in the picture content occurs. Significant changes are known to occur at scene changes for example, or during a high level of movement within images. Switching is optionally carried out at a significant change in picture luminance. The switching intervals typically vary considerably, eye to eye, there being an overall equalization of the time periods. By switching at significant changes in picture content, the switching is not as noticeable by the viewer, who continues to see a high quality stereoscopic images while disadvantages of possible ill effects on children, problems of a dominant eye and visual fatigue are overcome. Further, reduction in the bandwidth is also achieved. When switching occurs absent a significant change in the image content, the switch is noticeable by the viewer though the advantages of the invention remain supported.

FIG. 1 is an image processing flowchart.

The present invention also concerns the methodology of how the quality of images of one stream might be reduced to save on bandwidth. Image quality can be reduced by low-pass filtering, as suggested also by Perkins and Mitsuhashi; by reducing spatial or chroma resolution; by down sampling; by increasing the level of quantization in the encoding process; or by reducing the hit-rate on encoding. These different methods of reducing image quality can result in different types of artifacts that are visible when the images are viewed by themselves, but when combined stereoscopically with high quality images the visibility of the artifacts, depending on the level of degradation, are substantially reduced or even eliminated. It has been demonstrated, in studies on asymmetrical coding using stereoscopic video sequences of natural images, that the image to one eye can be degraded up to half the spatial resolution without an appreciable loss in image quality of the fused stereoscopic images (L.Stelmach, W. J. Tam, D. Meegan, & A. Vincent, "Stereo image Quality; Effects of Mixed Spatio-Temporal Resolution," *IEEE Transactions on Circuits and Systems for Video Technology*, Vol. 10, pp. 188–193, 2000; W. J. Tam, L. Stelmach, D. Meegan, & A. Vincent, "Bandwidth Reduction for Stereoscopic Video Signals," *Stereoscopics Displays and virtual Reality Systems VII*, Vol. 3957, pp. 33–40, 2000). This method holds great promise for reducing bandwidth and is useful as a pre-processing scheme before the encoding of the stereoscopic images. As well, and again using stereoscopic video sequences of natural images, it has been demonstrated by the inventors that the blocky artifacts introduced by coarse quantization or low bit rates for the stream to one eye are substantially masked and compensated for by the light-quality image in the other eye (W. J. Tam & L. Stelmach, "Perceived Image Quality of MPEG-2 Stereoscopic Sequences," *Human Vision and Electronic Imaging II*, Vol. 3016, pp. 296–301, 1997; L. Stelmach & W. J. Tam, " Stereoscopic Image Coding: Effect of Disparate Image-Quality in Left- and Right-Eye Views," *Signal Processing: image Communication*, Vol. 14, pp. 111–117, 1998).

For practical applications, the present invention is compatible with existing digital television broadcasting standards. Compared to equal coding of two separate channels, a useful bandwidth reduction is obtained while maintaining high perceived image quality. An advantage of the present invention is that it also provides a monoscopic (regular) broadcast-quality video stream for television receivers not equipped for receiving stereoscopic images. The monoscopic stream would comprise a concatenation of the high quality images from both streams. The switching of left-eye and right-eye views for the monoscopic stream is not noticeable because the switching occurs at significant changes in image contents. Alternatively one could concatenate the lower quality images from both streams for channels with lower bandwidth.

Another advantage of the present invention is that it is not affected by future improvements in display technology because the present invention deals with images or signals to produce the images, and not the manner in which the images are presented or projected. Specifically, irrespective of whether the display method is field-sequential, frame-sequential, simultaneous polaroid, anaglyph lenticular, autostereosopic, multi-view, or a combination of these and yet-to-be-developed methods, the present invention is applicable because it deals with the production of two views and these arc the minimum requirements for stereoscopic imagery. Basically, the present invention is not dependent on how the asymmetrically coded images are displayed, and can be projected or displayed using cathode-ray tubes (CRTs), liquid crystal devices (LCDs), digital mirror systems (DMSs), etc., and can be field-sequential, frame-sequential, or simultaneously shown to both eyes. Furthermore, the present invention does not preclude the media in which the images are embodied. That is, the images can be video signals or photographic film. For example, stereoscopic IMAX® films can he stored or shown stereoscopically such that one member of a stereoscopic pair is of standard 75 perf quality and the other member, for example, can be of reduced 35 mm quality. Savings in such a case would be in processing, storage, and distribution costs.

Numerous other embodiments of the present invention may be envisaged without departing from the spirit or scope of the invention.

What is claimed is:

1. A method for bandwidth reduction for stereoscopic video signals, comprising producing two streams of signals for production of separate images, one for each eye, one stream of signals of high quality and the other stream of signals of a reduced quality, and switching or transposing a plurality of times the two streams of signals to reverse the quality of pictures seen by each eye, the switching occurring at indeterminate intervals.

2. A method for bandwidth reduction for stereoscopic video signals as claimed in claim 1 wherein the switching occurs at significant changes in the image content.

3. A method for bandwidth reduction for stereoscopic video signals as claimed in claim 2 wherein the switching occurs over a plurality of image frames.

4. A method for bandwidth reduction for stereoscopic video signals as claimed in claim 2 wherein the switching occurs at one of major movement, changes in substantial features, or in image content.

5. A method for bandwidth reduction for stereoscopic video signals as claimed in claim 2 wherein the switching occurs at scene changes.

6. A method for bandwidth reduction for stereoscopic video signals as claimed in claim 2, wherein the reversing of the quality of images occurs upon changes in image luminance.

7. A method for bandwidth reduction for stereoscopic video signals as claimed in claim 1 wherein the reduced quality images are obtained by a pre-process of low-pass filtering.

8. A method for bandwidth reduction for stereoscopic video signals as claimed in claim 1 wherein the reduced quality images are obtained by performing a coarser quantisation on the reduced quality images than on the higher quality images.

9. A method for bandwidth reduction for stereoscopic video signals as claimed in claim 8 wherein the reduced quality images are obtained by a reduction in bit-rate on encoding.

10. A method for bandwidth reduction for stereoscopic video signals as claimed in claim 1 wherein the reduced quality images are obtained through a reduction in spatial resolution.

11. A method for bandwidth reduction for stereoscopic video signals as claimed in claim 1 wherein the reduced quality images are obtained through a reduction in chrominance.

12. A method for bandwidth reduction for stereoscopic video signals comprising the steps of:
   providing successive images having a first image quality for viewing by a first eye;
   providing successive images having a second lower image quality for viewing by a second eye;
   during a single program, transposing the image quality such that the successive images having a second lower image quality are for viewing by the first eye and the successive images having the first image quality are for viewing by the second eye.

13. A method for bandwidth reduction for stereoscopic video signals as claimed in claim 12, wherein the transposing occurs between frames wherein a significant change in the image content occurs.

14. A switch as claimed in claim 13, wherein the reversing of the quality of pictures occurs on occasions of scene changes, major movement, changes in features, or changes in picture luminance.

15. A method for bandwidth reduction for stereoscopic video signals as claimed in claim 12 wherein the successive images are video images for display on a video display device.

16. A method for bandwidth reduction for stereoscopic video signals as claimed in claim 1 wherein the resources for storing and transmitting the first and second successive images is less than the resources for storing and transmitting two high quality streams of successive images approximately simultaneously.

17. A method for displaying stereoscopic video imagery, comprising the steps of:
   producing a first stream of images or video signal comprising images of high quality and images of reduced quality, for display to an eye of an individual viewer;

producing a second stream of images or video signal comprising images of high quality and images of reduced quality, for display to an eye of a same individual viewer, the second stream including images of high quality for display approximately simultaneous to images of reduced quality within the first stream or video signal and including images of reduced quality for display approximately simultaneous to images of high quality within the first stream or video signal;

wherein within each of the first and second streams of images or video signals, transitions from images of high quality to images of reduced quality occurs within each stream at indeterminate intervals.

18. A method for bandwidth reduction for stereoscopic imagery, comprising the steps of:

producing separate streams of images or video signals, one for display to each of two eyes of a same individual viewer, such that one stream consists of images of high quality and the other stream consists of images of reduced quality; and transposing the image quality of the two streams of images seen by each eye at indeterminate intervals.

19. A method for displaying stereoscopic video imagery, comprising the steps of:

producing a first stream of images or video signal comprising images of high quality and images of reduced quality, for display to an eye of an individual viewer;

wherein within the first stream of images or video signal, transitions from images of high quality to images of reduced quality occurs at significant changes in the image content.

20. A system for providing stereoscopic video imagery comprising:

a processor for receiving successive images having a first image quality for viewing by a first eye and successive images having a second lower image quality for viewing by a second eye and for, during a single program, determining a substantial change in image content between successive images; and, a controller for transposing the image quality such that the successive images having a second lower image quality are for viewing by the first eye and the successive images having the first image quality are for viewing by the second eye.

* * * * *

UNITED STATES PATENT AND TRADEMARK OFFICE
CERTIFICATE OF CORRECTION

PATENT NO. : 6,678,323 B2
DATED : January 13, 2004
INVENTOR(S) : Tam et al.

It is certified that error appears in the above-identified patent and that said Letters Patent is hereby corrected as shown below:

<u>Title page,</u>
Item [56], References Cited, OTHER PUBLICATIONS, last reference
should read -- "Visual Masking at Video Scene Cuts", SPIE vol. 2411, pp. 111-119, Feb 5-10, 1995, San Jose, California, USA --

<u>Column 2,</u>
Line 48, "hit-rate" should read -- bit rate --
Line 50, "arc" should read -- are --
Line 65, "virtual" should read -- Virtual --

<u>Column 3,</u>
Line 6, "light-quality" should read -- high-quality --
Line 10, immediately before, the symbol """ should read -- " --
Line 12, "image" should read -- Image --
Line 38, "arc" should read -- are --
Line 48, "can he" should read -- can be --
Line 60, "high quality" should read -- high image quality --

<u>Column 4,</u>
Line 25, "bit-rate" should read -- bit rate --

Signed and Sealed this

Fifteenth Day of June, 2004

JON W. DUDAS
*Acting Director of the United States Patent and Trademark Office*